(12) United States Patent
Fair

(10) Patent No.: US 8,935,470 B1
(45) Date of Patent: Jan. 13, 2015

(54) PRUNING A FILEMARK CACHE USED TO CACHE FILEMARK METADATA FOR VIRTUAL TAPES

(75) Inventor: Robert L. Fair, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 307 days.

(21) Appl. No.: 13/620,394

(22) Filed: Sep. 14, 2012

(51) Int. Cl.
*G06F 13/00* (2006.01)
*G06F 13/28* (2006.01)
*G06F 3/06* (2006.01)

(52) U.S. Cl.
CPC ..................................... *G06F 3/0682* (2013.01)
USPC .................... 711/113; 711/112; 711/E12.019

(58) Field of Classification Search
CPC .................................................... G06F 3/0682
See application file for complete search history.

(56) References Cited

U.S. PATENT DOCUMENTS

| | | | |
|---|---|---|---|
| 6,718,427 B1 | 4/2004 | Carlson et al. | |
| 7,447,698 B2 | 11/2008 | Schopp | |
| 7,519,767 B2 | 4/2009 | Slater | |
| 7,979,670 B2 | 7/2011 | Saliba et al. | |
| 8,280,855 B2 | 10/2012 | Bish et al. | |
| 8,341,346 B2 | 12/2012 | Ashton et al. | |
| 2006/0010275 A1 | 1/2006 | Moon et al. | |
| 2008/0040539 A1 | 2/2008 | Haustein et al. | |
| 2009/0049260 A1 | 2/2009 | Upadhyayula | |

OTHER PUBLICATIONS

Non-Final Office Action, U.S. Appl. No. 13/620,085, dated Jun. 12, 2014, 18 pages.

*Primary Examiner* — Eric S Cardwell
(74) *Attorney, Agent, or Firm* — Blakely, Sokoloff, Taylor & Zafman LLP

(57) ABSTRACT

A method of an aspect includes determining to prune a filemark cache. The filemark cache has entries that each store filemark metadata for a different corresponding filemark of a plurality of open virtual tape files. The method also includes pruning the filemark cache by removing a portion of the entries of the filemark cache. Other methods, apparatus, and articles are also disclosed.

21 Claims, 11 Drawing Sheets

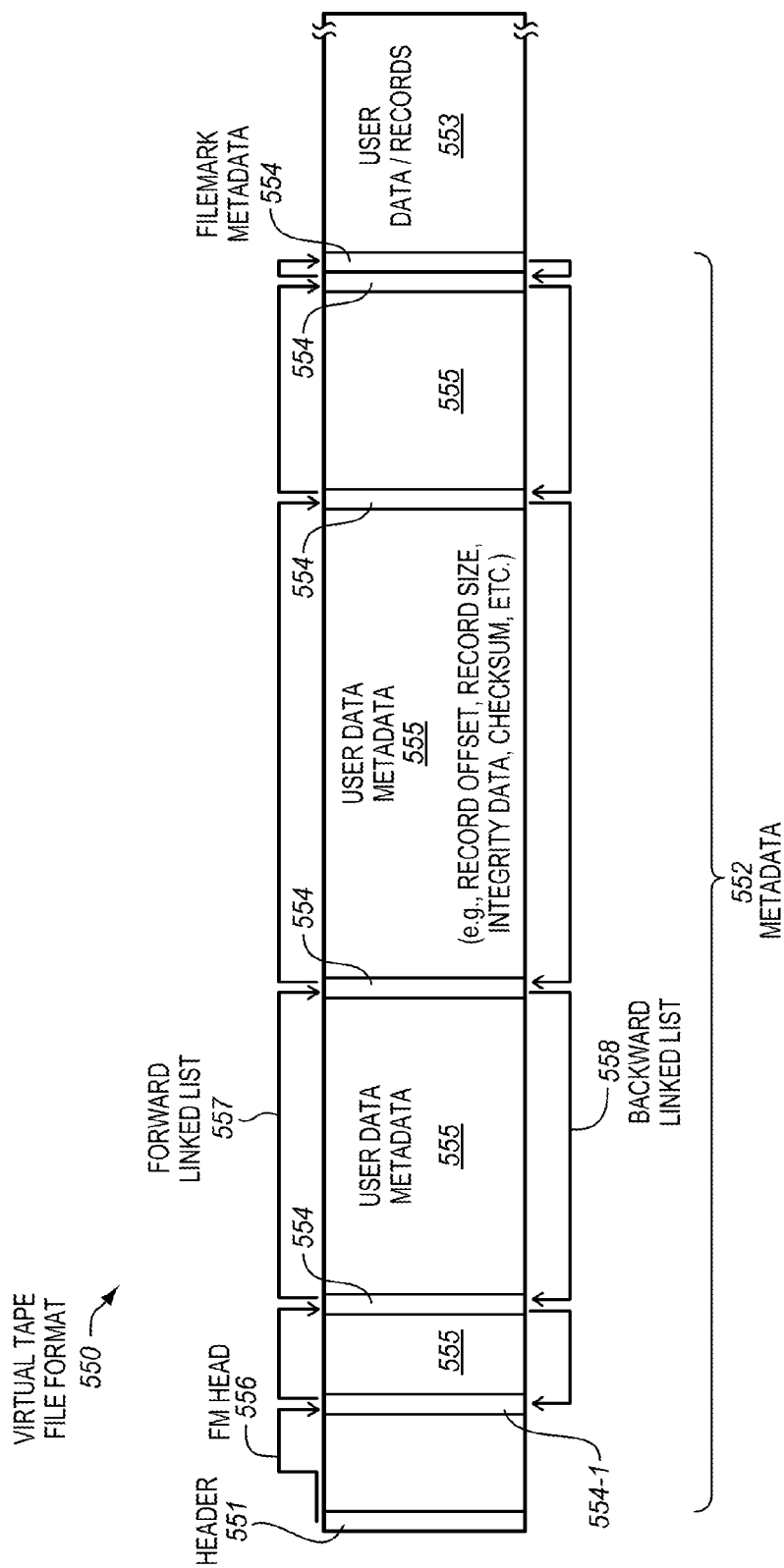

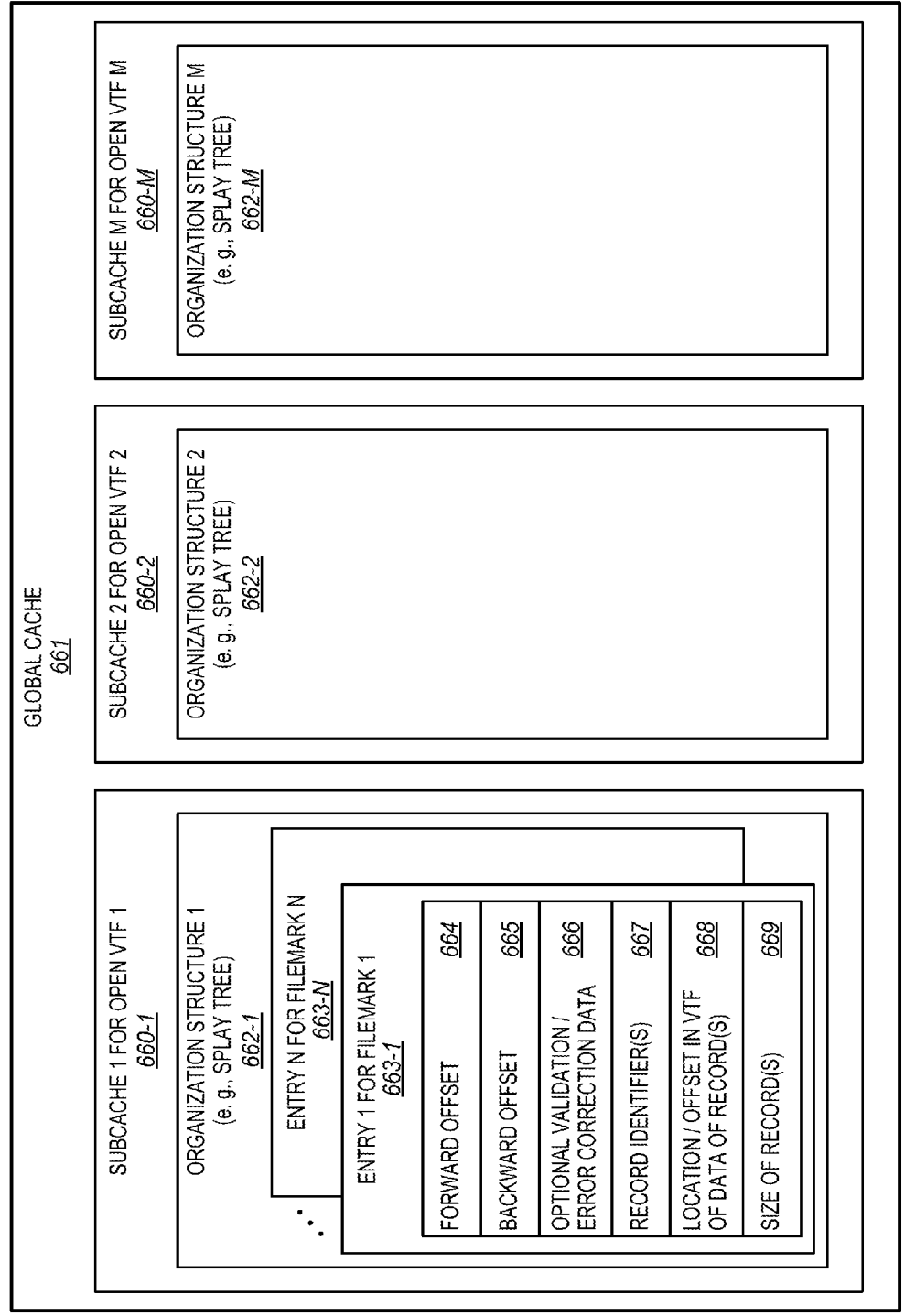

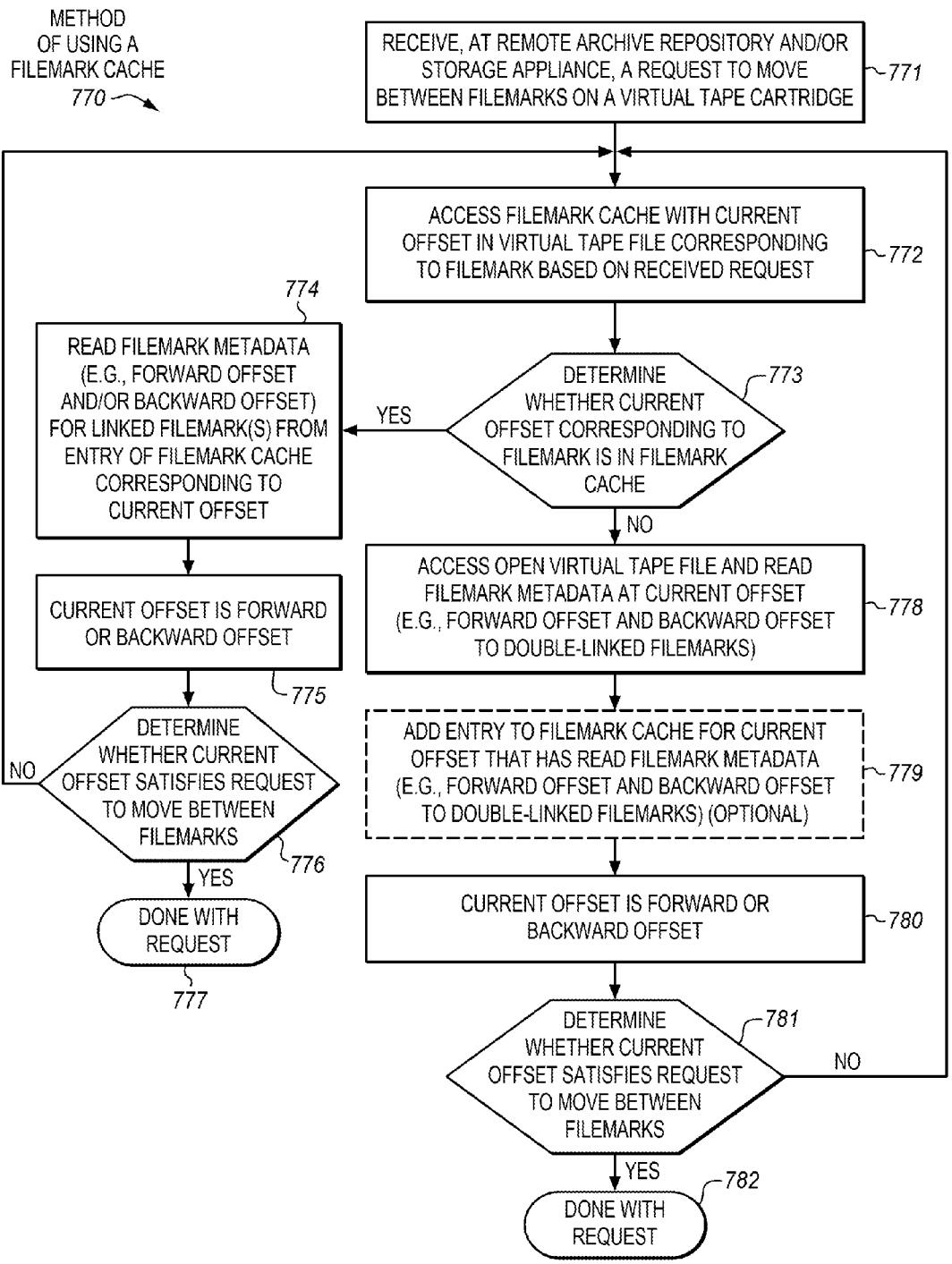

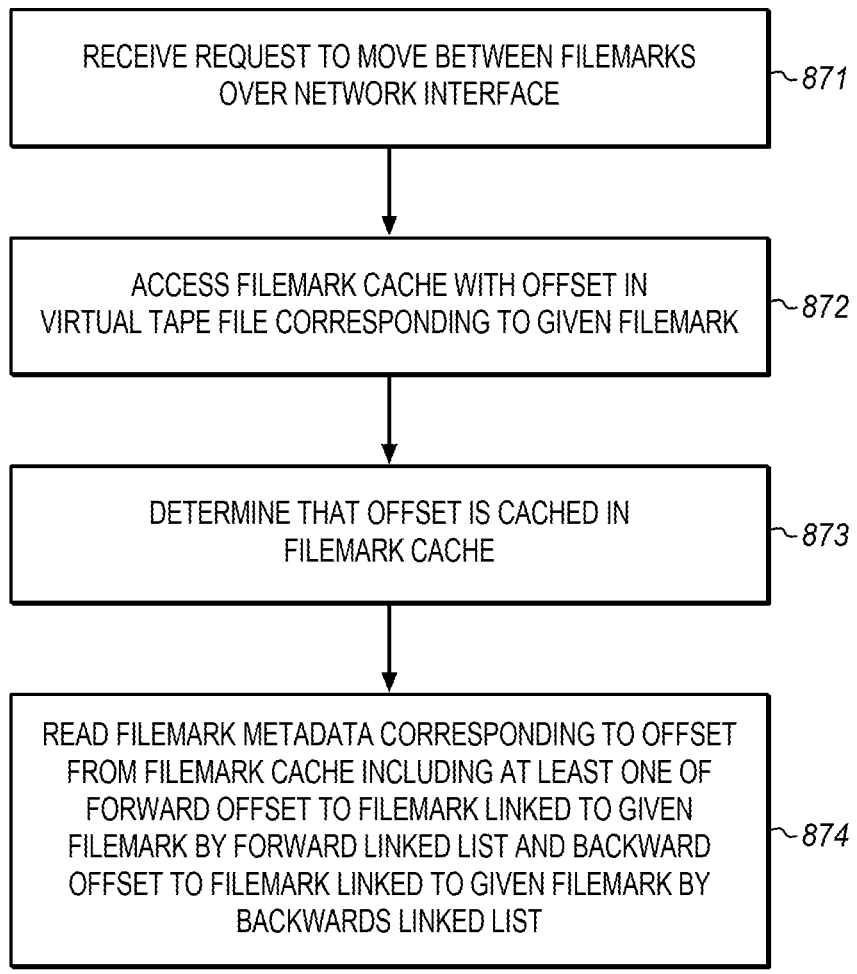

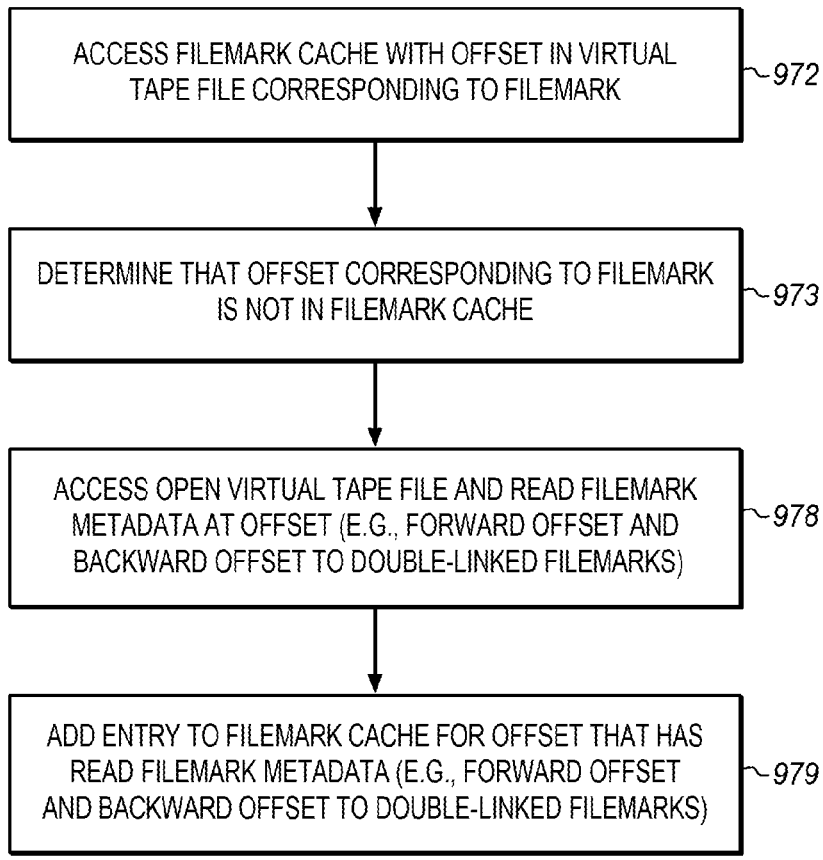

FIG. 10

METHOD
OF ADDING ENTRY
TO FILEMARK CACHE
1083

- RECEIVE, AT REMOTE ARCHIVE REPOSITORY AND/OR STORAGE APPLIANCE, A REQUEST TO WRITE A NEW FILEMARK ON A VIRTUAL TAPE CARTRIDGE — 1084
- ACCESS OPEN VIRTUAL TAPE FILE AND WRITE NEW FILEMARK METADATA (E.G., FORWARD OFFSET AND BACKWARD OFFSET TO DOUBLE-LINKED FILEMARKS) AT OFFSET OF NEW FILEMARK OF RECEIVED REQUEST — 1085
- ADD ENTRY TO FILEMARK CACHE FOR OFFSET OF NEW FILEMARK OF REQUEST THAT HAS FILEMARK METADATA (E.G., FORWARD OFFSET AND BACKWARD OFFSET TO DOUBLE-LINKED FILEMARKS) — 1086

PRUNING A FILEMARK CACHE USED TO CACHE FILEMARK METADATA FOR VIRTUAL TAPES

BACKGROUND

1. Field

The present disclosure relates to virtual tapes, and in particular to use of filemarks in virtual tapes.

2. Background Information

One way that has been used historically to store data is with the use of a physical tape library. A physical tape library represents a collection of physical tapes (e.g., physical magnetic tapes). Often a physical tape library may include a large number, for example thousands to hundreds of thousands, of such physical tapes. A robotic arm known as a picker may be used to select the physical tapes from slots and insert them into physical tape drives under electronic control. The physical tape library may be coupled with a network and used for network data storage. Backup software applications or other software (e.g., on network coupled computers) may be configured to use such physical tape libraries.

The physical tape libraries generally employ block or record-based storage organization. For example, 64-kB records, 128-kB records, or other fixed sized blocks of data may be stored. At the end of one or more blocks of data, or for other reasons, the backup application, or other software using the physical tape libraries, may write what is known in the arts as a filemark. In a physical tape, a filemark may simply represent a signature or string of bits that indicate that it is a filemark. The filemark may identify or mark a position separating one or more preceding blocks of data appearing before the filemark from one or more blocks of data following the filemark. Different backup applications may use filemarks to indicate different things, such as, for example, to separate records, logical files, groups of logical files, or for other reasons. Some backup applications (e.g., NetWorker) may also write filemarks for internal consistency purposes. Physical tape libraries and physical tape drives have commands to move around within such filemarks. For example, there are Small Computer System Interface (SCSI) commands to specify go forward on the physical tape ten filemarks, go to the next filemark on the physical tape, go to the previous filemark, go back five filemarks on the physical tape, go to the end of the physical tape and then go back five filemarks from the end of the physical tape, and the like. The physical tape drives actually spin the physical tapes, and reel or unreel the magnetic tape, to move between the filemarks.

FIG. 1 is a block diagram of a representative physical magnetic tape format 100. The tape is illustrated as if it were spread out full length. From the beginning of the tape (on the left as viewed), the physical magnetic tape includes a physical beginning of media (BOM) mark 101, a label 102, a filemark 103-1 after the label and BOM, and a data record 104-1 after the filemark. Generally, along most of its length the physical magnetic tape will have data records 104 separated by filemarks 103. The records may be of various different lengths. The filemarks may be used by software to separate different types of things (e.g., separate logical files, separate groups of logical files, separate records, etc.). Toward the end of the tape (on the right as viewed), the physical magnetic tape may include physical end of tape (PEOT) mark 105.

One drawback to such physical tape libraries is that they rely on robotics or other mechanics to function. As such, physical tape libraries tend to be relatively susceptible to malfunction (e.g., the robotic arms may break, the robot arms may drop physical tapes, etc.). However, existing backup applications and technology has been designed to use physical tape libraries.

Virtual tape libraries provide an alternative to physical tape libraries. The virtual tape libraries appear to be physical tape libraries to the backup applications, or other software that utilize them (e.g., the virtual tape libraries may emulate physical tape libraries). However, the virtual tape libraries typically do not actually store the data on physical magnetic tapes, but rather store the data on one or more hard disk drive arrays, solid state storage devices, or other types of physical storage. This offers an advantage that the virtual tape libraries do not need to rely on the mechanics or robotic arms used for physical tape libraries. Moreover, the backup applications, or other software utilizing the virtual tape library, do not need to know that physical magnetic tapes are not being used for data storage, and do not need to be changed. This helps to avoid modifying existing backup applications and technology that has been designed to use physical tape libraries. As a further advantage, the data stored by a backup application to a virtual tape may be stored as a file of a file system. As such, the virtual tape libraries are generally able to take advantage of advanced file system functionalities, such as improved ability to perform data deduplication, replication, redundancy, segmenting, and/or other file system based technologies.

As mentioned above, the virtual tape library should appear to be and/or should emulate a physical tape library so that the backup applications, or other software using the virtual tape library, do not need to know that they are not using a physical tape library. This includes the handling of filemarks. For example, the virtual tape library should be able to move between filemarks (e.g., in response to commands to move between filemarks supported by the physical tape libraries which the virtual tape library is emulating). For example, the virtual tape libraries should generally be able to handle commands, such as, for example, SCSI SPACE commands to go forward ten filemarks, go to the next filemark, go back five filemarks, or the like.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 5 is a block diagram of an embodiment of a virtual tape file format.

FIG. 6 is a block diagram of an embodiment of a filemark cache.

FIG. 7 is a block flow diagram of an embodiment of a method of using a filemark cache to move between filemarks in a virtual tape cartridge.

FIG. 8 is a block flow diagram of a second embodiment of a method of using a filemark cache to move between filemarks in a virtual tape cartridge.

FIG. 9 is a block flow diagram of a first embodiment of a method of adding an entry to a filemark cache.

FIG. 10 is a block flow diagram of a second embodiment of a method of adding an entry to a filemark cache for a newly written filemark.

DETAILED DESCRIPTION

In the following description, numerous specific details are set forth, such as specific remote archive repository and/or storage appliance configurations, virtual tape file formats, arrangements and contents of a filemark cache, types of filemark metadata, orders of operations in flowcharts, component partitioning/integration details, and the like. However, it is understood that embodiments of the invention may be practiced without these specific details. In other instances, well-known circuits, structures and techniques have not been shown in detail in order not to obscure the understanding of this description.

Figure 1:
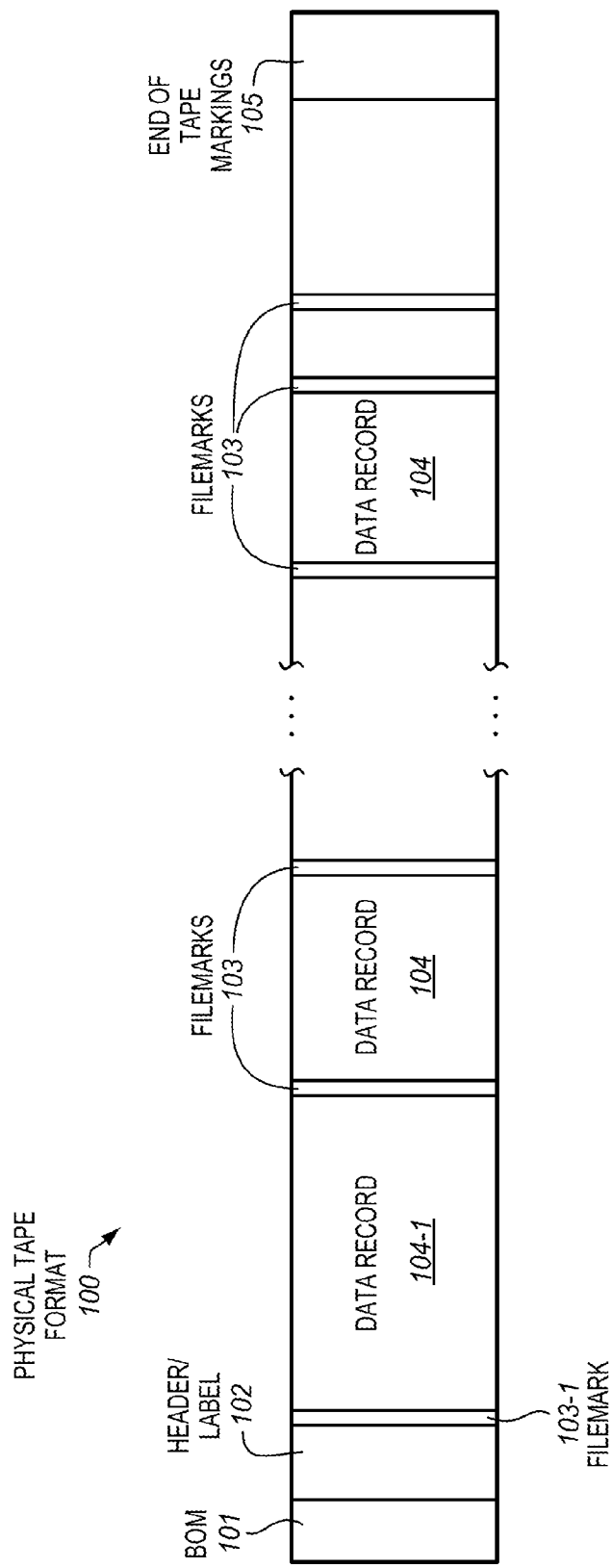
FIG. 1 is a block diagram of a physical magnetic tape format.
Figure 2:
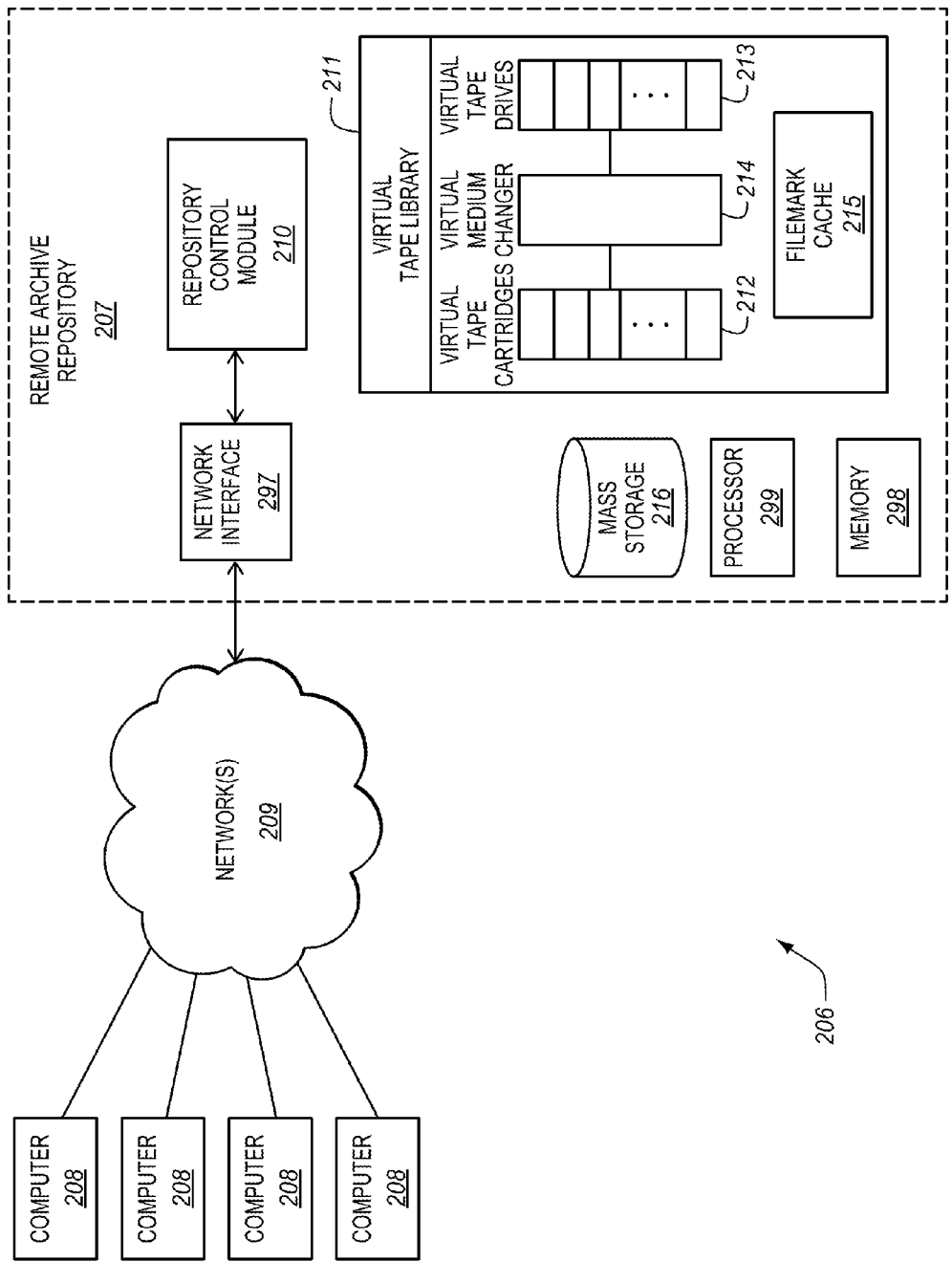
FIG. 2 is a block diagram of a network storage system including an embodiment of a remote archive repository.

FIG. 2 is a block diagram of a network storage system 206 including an embodiment of a remote archive repository 207 to backup or otherwise store data for a plurality of computers 208 that are coupled with the remote archive repository over one or more intervening networks 209. While in the illustration only four computers are shown, it is to be appreciated that there may be potentially a large number of such computers. Each of the computers may represent a desktop, workstation, server, portable, laptop, or other type of computer. The one or more intervening networks 209 may represent one or more public, private, local area, wide area, wired, wireless, hybrid, or other types of networks, or a combination of different types of networks. The scope of the invention is not limited to any known type of network.

The remote archive repository 207 includes a repository control module 210. The repository control module may be implemented in software, firmware, hardware, or a combination thereof. The remote archive repository also includes a virtual tape library 211. The virtual tape library includes a plurality of virtual tape cartridges 212, a plurality of virtual tape drives 213 to interface with the virtual tape cartridges, and a virtual medium changer 214 to virtually place virtual tape cartridges in the virtual tape drives. The repository control module may control or manage various different operational aspects of the remote archive repository in generally conventional ways. In one embodiment, the repository control module may control or manage storage of data in the virtual tape library, access to data in the virtual tape library, movement between filemarks in the virtual tape library, and the like.

Applications (e.g., backup applications, archive applications, or other software) on each of the computers 208 may backup or otherwise store data on the remote archive repository 207. The applications may determine when to store data and may transmit copies of the data over the one or more intervening network(s) to the remote archive repository. The applications may also issue commands to access the data (e.g., read and/or write data). The applications may also issue commands to move between filemarks in the virtual tape cartridges. For example, the applications may transmit Small Computer System Interface (SCSI) SPACE commands to move between filemarks in the virtual tape cartridges. By way of example, the commands may represent move forward three filemarks, move backwards ten filemarks, move to the beginning of media (BOM). Referring again to FIG. 2, the virtual tape library includes an embodiment of a filemark cache 215.

As will be explained further below, the filemark cache may offer a benefit of efficient and/or rapid movement between filemarks.

The remote archive repository also includes mass storage 216. Data of the virtual tape library may ultimately, often after additional processing (e.g., deduplication, redundancy, segmenting, etc.), be stored on the mass storage. Examples of suitable mass storage include, but are not limited to, one or more hard disk arrays, sets of magnetic disks, solid-state storage devices, physical tapes, other mass storage devices known in the arts, and combinations of such different types of mass storage. The mass storage may be either in the same or a different location as the virtual tape library depending on the particular implementation.

Figure 3:
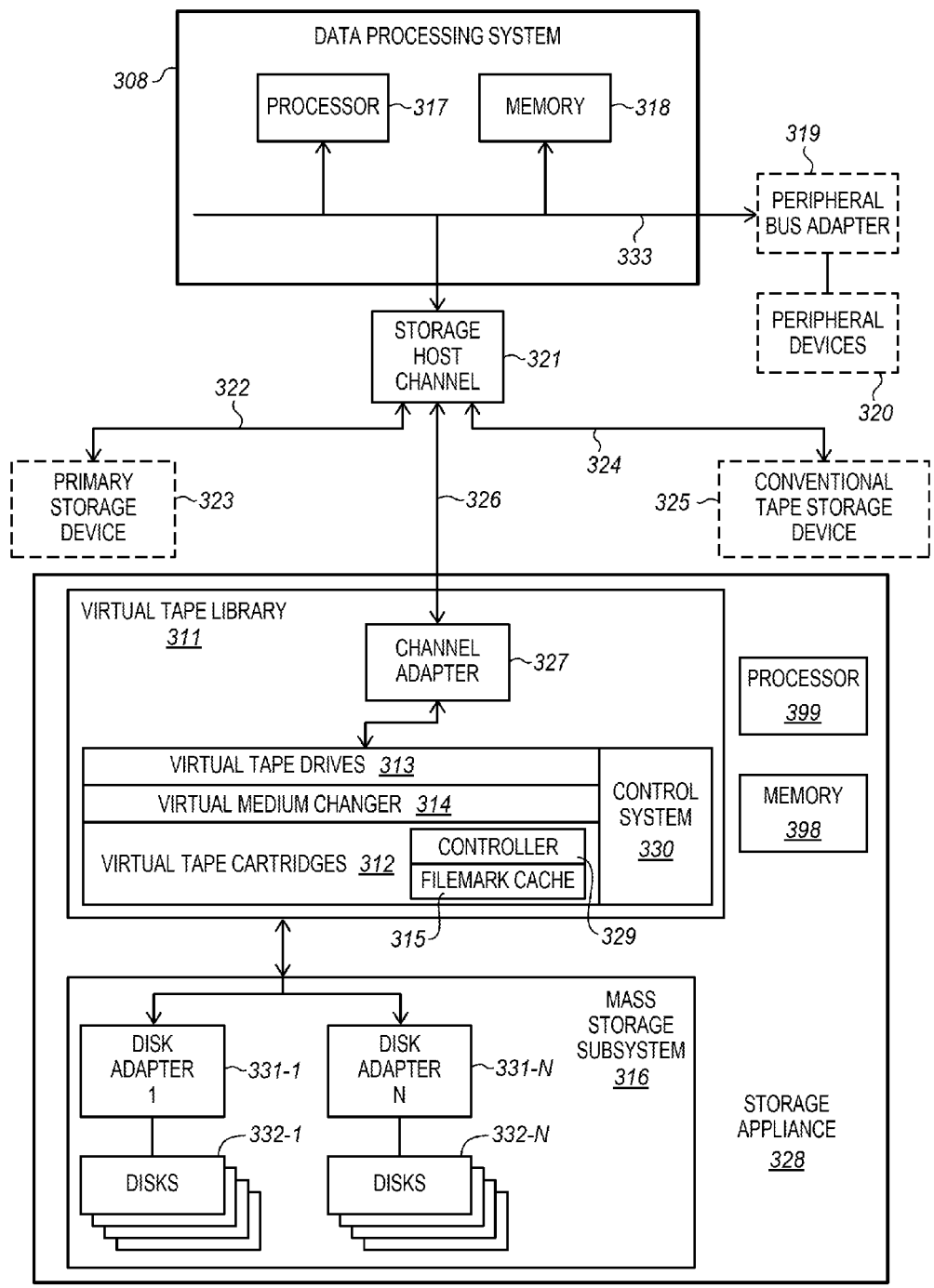
FIG. 3 is a block diagram of a data processing system coupled to an embodiment of a storage appliance.

FIG. 3 is a block diagram of a data processing system 308 coupled to a storage appliance 328. The data processing system may be a desktop, workstation, server, laptop, or other computer, or other type of data processing system. The data processing system has a processor 317 (e.g., a central processing unit (CPU)) coupled to an internal memory 318 (e.g., a Dynamic Random Access Memory (DRAM)) by an internal bus 333. A peripheral bus adapter or hub 319 coupled to the bus 333 provides a communications path for peripheral devices 320, such as printers, local terminals, local and wide area networks, displays, graphics, additional memory or storage and the like.

A storage host controller or channel 321 coupled to the bus 333 provides communications paths to a variety of different storage media. This storage host controller or channel may communicate through a network adapter and/or directly through peripheral device busses. A first channel 322 may provide a communications path between the storage host channel and a primary storage device 323 (e.g., a magnetic disk storage unit or hard disk drive). The primary storage device may store an operating system, applications, software programs, local data, or the like. A second channel 324 may provide a communications path between the storage host channel and a conventional physical magnetic tape storage device 325. A third channel 326 may provide a communications path between the storage host channel and the storage appliance 328.

The storage appliance includes a virtual tape library 311 coupled with a mass storage subsystem 316. A host or channel adapter 327, for example within the virtual tape library, is coupled with the storage host channel 321. The virtual tape library also includes virtual tape drives 313, a virtual medium changer 314, and virtual tape cartridges 312. The virtual tape cartridges include an embodiment of a filemark cache 315 and an embodiment of a filemark cache controller 329 to control operation of the filemark cache (e.g., control adding entries to the filemark cache, control creating or removing filemark subcaches, control higher level methods of using the filemark cache, etc.). Various different embodiments of filemark caches, operations performed with respect to filemark caches, and methods of using filemark caches, will be discussed elsewhere herein. In the illustrated embodiment, the filemark cache is shown within the virtual tape cartridges, although this is not required. The virtual tape library also includes a control system 330 to control various aspects associated with the virtual tape library.

Ultimately, data sent through the virtual tape library 311 may be stored on the mass storage subsystem 316. This may occur after file system related operations have been performed on the data (e.g., for deduplication, redundancy, redundant array of independent disks (RAID), etc.). In one embodiment, the storage appliance is a deduplication backup appliance and performs deduplication on the data, although this is not required. The illustrated embodiment of the mass storage system includes multiple disk adapters 331-1 through 331-N each having a corresponding array or set of magnetic or hard disks 332-1 through 332-N. Other embodiments may use other mass storage (e.g., a single set of hard disks, magnetic tape mass storage, semiconductor mass storage, other types of mass storage, combinations of different types of storage, etc.). This is just one illustrative example. Other embodiments may be used in either lesser (e.g., some of the illustrated components may be removed) and/or more equipped systems (e.g., additional components may be added).

Figure 4:
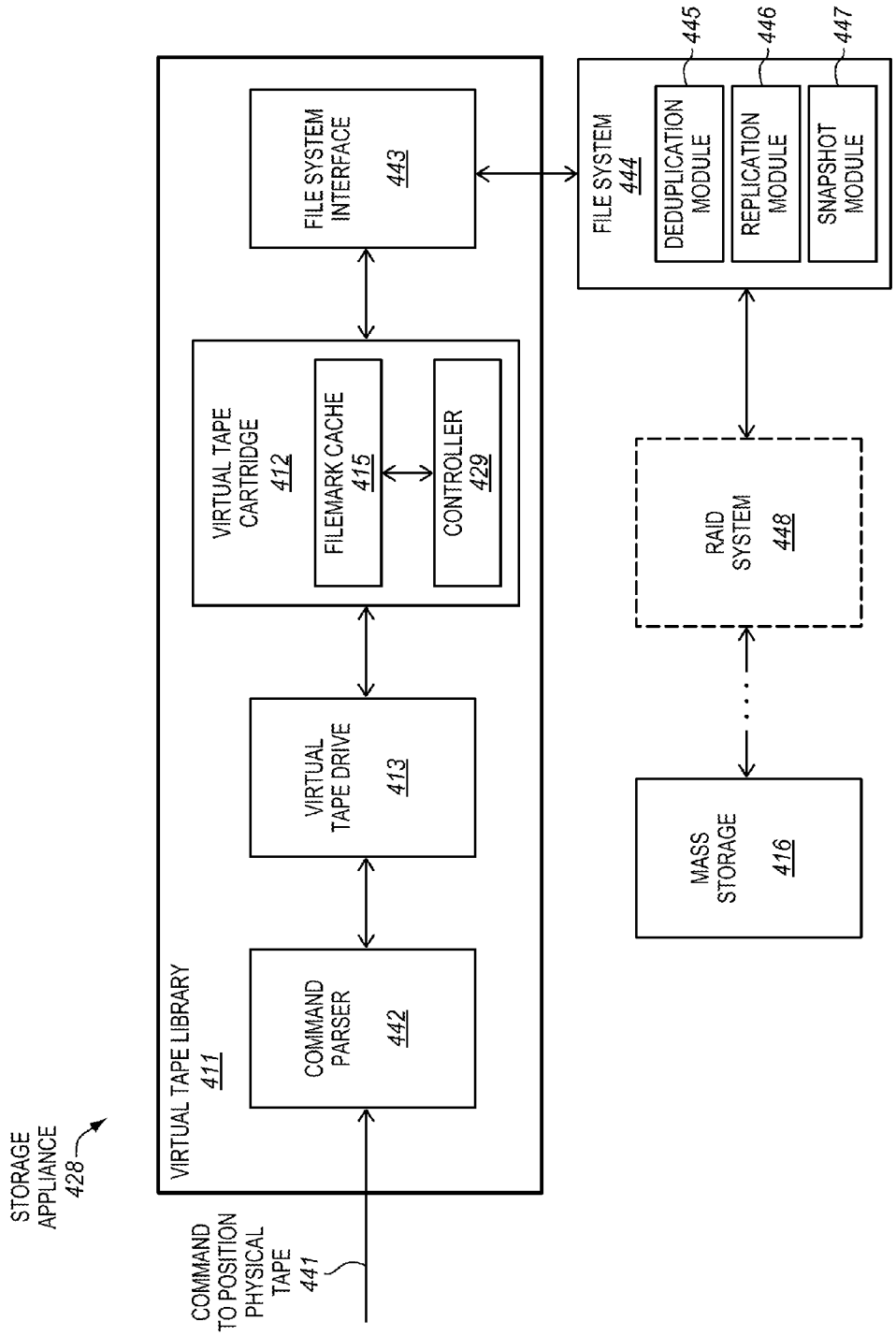
FIG. 4 is a block diagram of an embodiment of a storage appliance in which a file system is logically disposed between a virtual tape library and mass storage.

FIG. 4 is a block diagram of a storage appliance 428 that includes a file system 444 logically disposed between a virtual tape library 411 and mass storage 416 used to store data written to the virtual tape library. Commands or other requests 441 to position a physical tape may be provided to the virtual tape library 411. For example, they may be sent from computers to the storage appliance over a network and received on a network interface of the storage appliance. The virtual tape library includes a command parser 442 to parse the commands. In one example, the commands may be SCSI commands (e.g., a SPACE command) and the command parser may be a SCSI command parser. A virtual tape drive 413 is coupled with the command parser. A virtual tape cartridge 412 is coupled with the virtual tape drive. The virtual tape cartridge includes a filemark cache 415 and a controller 429 to control, manage, or facilitate use of the filemark cache.

The virtual tape library also includes a file system interface 443 to interface with the file system 444. Data from the virtual tape library may be stored as files (e.g., virtual tape files) through the file system. In various embodiments, the file system may support any one or more of various different types of file processing operations associated with network data storage. By way of example, the file system may include a deduplication module 445 to perform deduplication, a replication module 446 to perform replication, a snapshot module 447 to perform a snapshot, etc. In some embodiments, data from the file system may be provided to an optional redundant array of independent disks (RAID) system 448. Data from the RAID system and/or from the file system may be stored on mass storage 416.

FIG. 5 is a block diagram of a suitable embodiment of a virtual tape file format 550. The virtual tape file format includes a header 551, metadata 552, and user data 553. The illustrated format initially includes the header, followed by the metadata, followed in turn by the user data. The header 551 represents the start of the virtual tape file. The user data 553 represents records or blocks of data of any desired type. Without limitation, there may be on the order of about 400 gigabytes of user data corresponding to a physical tape.

The metadata 552 describes other data. The metadata includes filemark metadata 554 and user data metadata 555. The filemark head (FM head) 556 of the header has an offset of a first (leftmost as viewed) filemark metadata 554-1. The filemark metadata describes the filemarks of the physical tape file emulated by the virtual tape file. In particular, the filemark metadata describes positions of these filemarks in terms of a doubly-linked list including a forward linked list 557 and a backward linked list 558. Each filemark metadata corresponding to a discrete filemark position includes an offset to the nearest filemark in the forward direction (to the right in the illustration), and an offset to the nearest filemark in the backwards direction (to the left in the illustration). By way of example, each of the discrete filemark metadata may have on the order of 40-bytes, although this is not required. The user data metadata 555 describes the user data 553. By way of example, the user data metadata may include, for example, offsets to records in the user data, sizes of records in the user data, integrity data for the user data, checksums for the user data, etc. In other embodiments, the metadata may omit some of this metadata and/or include additional metadata.

The doubly-linked list may be used to move between filemarks. For example, from a given filemark position or offset the double-linked list can be used to find the positions or offsets of the closest filemarks in both the forward and backward directions. For example, in order to move forward by two filemark positions from a starting filemark, a first forward offset in the filemark metadata corresponding to the starting filemark may be followed to reach the filemark metadata for an intermediate filemark, and then a second forward offset in the filemark metadata for the intermediate filemark may be followed to reach the desired filemark. This is referred to as walking or otherwise moving through the linked list.

Now, in cases where virtual tape files have relatively few filemarks (e.g., on the order of tens to hundreds of filemarks) this can generally be done relatively quickly. However, when the virtual tape files have relatively more filemarks (e.g., on the order of thousands to tens of thousands) the time to walk or otherwise move through the linked list tends to become relatively more significant. Walking through the linked list using the virtual tape file may represent random, small reads (e.g., each on the order of 40-bytes) to move through a relatively large number of filemarks (e.g., potentially thousands or tens of thousands). Moreover, the virtual tape library may have multiple (e.g., often on the order of tens to hundreds) of virtual tapes each performing such random, small reads, to move through a relatively large number of filemarks. This generally represents a large load on a storage appliance or other equipment implementing the virtual tape library. In addition, equipment optimized for backup through streaming or sequential I/O is often not as efficient or fast at such random reads. This may be compounded further by any deduplication or related file system processing performed on the data to reconstitute the data before it is returned to computers over the network. Such deduplication and other file system processing is also generally most efficient for streaming or sequential retrieval rather than for small random reads.

It is to be appreciated that this is just one example of a suitable virtual tape file format and that the scope of the invention is not limited to this particular format. Other formats may rearrange the data differently. Moreover, in the illustrated example, the filemark metadata and user data metadata are in different regions of the virtual tape file, although in other examples they may be intermingled. In still other examples, the filemark metadata and the user data metadata may potentially be in a different file than the user data.

FIG. 6 is a block diagram of an embodiment of a filemark cache 615. In some embodiments, the filemark cache may be logically implemented within the virtual tape cartridge layer of a virtual tape library, although this is not required. The filemark cache may be implemented in a non-volatile and/or a volatile memory. In one embodiment, the filemark cache may be implemented in volatile memory (e.g., DRAM or other random access memory) of a storage appliance that is separate from mass storage used to store the user data or records for the virtual tape library, and optionally a backup of the filemark cache may be stored in a non-volatile memory.

As shown, in some embodiments, the filemark cache may include a set of local caches or subcaches 660-1, 660-2, . . . 660-M. The subcaches are allocated from a fixed or finite amount of resources or a global memory pool conceptually representing a global cache 661. The global cache may represent a maximum amount of memory space used to implement the filemark cache. In some embodiments, each of the subcaches may correspond to a different open virtual tape file or open virtual tape cartridge. In particular, in the illustrated embodiment, a subcache 1 660-1 is provided for an open virtual tape file 1, a subcache 2 660-2 is provided for an open virtual tape file 2, and a subcache M 660-M is provided for an open virtual tape file M. Advantageously, the use of different subcaches for different open virtual tape files allows cache access (e.g., lookup, insert, remove) to be largely independent for each virtual tape cartridge which helps to reduce locking contention. Commonly, a virtual tape library may have a large number of virtual tape cartridges (e.g., potentially on the order of tens of thousands to hundreds of thousands). Each of the subcaches may be dynamically opened (with resources allocated from the global cache), for example when the corresponding virtual tape file or virtual tape cartridge is opened, and populated with filemark cache entries based on the activity associated with that open virtual tape file or virtual tape cartridge (e.g., based on filemarks accessed). Correspondingly, each of the subcaches may be dynamically closed, with its resources being returned to the global cache, when the corresponding virtual tape file or virtual tape cartridge is closed. In one embodiment, there may be on the order of hundreds of open virtual tape files at a given time (e.g., from around 100 to 1000, or in some cases from around 300 to 700).

In some embodiments, each subcache may have a separate or independent organization structure or data structure that is separate or independent of those of the other subcaches. In the illustrated embodiment, subcache 1 has an organization structure 1 662-1, subcache 2 has an organization structure 2 662-2, and subcache M has an organization structure M 662-M. These structures organize and/or structure entries for corresponding filemarks. In the illustrated embodiment, an entry 1 663-1 corresponds to a filemark 1, an entry N 663-N corresponding to a filemark N, etc. Initiating or creating a new subcache (e.g., when a new virtual tape file is opened) may include generating an organizational data structure, and populating the organizational data structure with entries during runtime.

Different types of organizational structures are contemplated. In some embodiments, the organizational data structures may be binary search trees. A binary search tree is a data structure for tables and lists that is represented to make accessing, inserting, and deleting items easier. Data may be accessed from a binary search tree by searching down from the root, branching left or right at each node according to whether the desired data is less than or greater than the data at the current node, and stopping when the node containing the data is reached.

In some embodiments, a splay tree may be used as an organizational structure. A splay tree is a type of self-adjusting binary search tree. The efficiency the splay tree comes in large part from applying a restructuring heuristic, referred to as splaying, after each access of the splay tree. The splay tree may begin in an arbitrary state, but after each operation it may be splayed or restructured to improve the efficiency of future operations. Splaying moves a node to the root of the tree by performing a sequence of rotations along the path from the node to the root. These sub-operations are referred to as zig, zig-zig, and zig-zag. Such restructuring may help to improve the speed and/or efficiency of accessing frequently used data from the filemark cache. In practice, some movement through filemarks tends to be relatively sequential (e.g., move forward or backward one filemark) whereas other movement tends to be non-sequential (e.g., substantially random). Advantageously, splay trees generally tend to be efficient at both sequential and non-sequential movement. Moreover, especially when there are thousands of filemarks, and both sequential and non-sequential movement is present, the automatic rebalancing of the splay tree helps to allow the most relevant data to be accessed efficiently.

Alternatively, other self-adjusting binary trees, other restructuring data structures, or other data structures known in the arts may optionally be used. Examples of other contemplated data structures that may be used include, but are not limited to, a hash table with an associated linked list, a simple double-linked list, and various binary tree structures. Moreover, if desired, different organization structures may be used for different subcaches. Part of the resource allocation for a subcache may be consumed by organization structure metadata used to describe the structure the connectivity, arrangement, or organization of the organization structure. In one embodiment in which a splay tree is used, on the order of around 20-bytes or so of information may be provided per entry of the organization structure, although this is not required.

Each of the entries stores filemark metadata for the corresponding filemark. In one embodiment, each entry of the filemark cache corresponding to a particular filemark may include at least some of, most of, or the same filemark metadata as the virtual tape file format of FIG. 5. In one embodiment, each entry of the filemark cache corresponding to a particular filemark may include all of the same filemark metadata as the virtual tape file format of FIG. 5. In this way, when there is a "hit" in the filemark cache, the same filemark metadata may be retrieved from the filemark cache as would be retrieved if instead the virtual tape file in the file system were accessed but without having to perform a file system read. One particular embodiment of possible metadata stored in an entry of the filemark cache is shown in the illustrated entry 1 663-1. In this embodiment, the metadata includes a forward offset 664 and a backward offset 665. These represent a pair of offsets of a double-linked list similar to those described above in conjunction with FIG. 5. The forward offset represents an offset to the nearest filemark in the forward direction and a backward offset represents an offset to the nearest filemark in the backwards direction. The "forward" means moving forward in the virtual tape in a direction away from the virtual tape BOM and "backwards" means moving backwards in the virtual tape in a direction toward the virtual tape BOM. In this embodiment, the metadata also includes optional validation and/or error correction data 666, one or more record identifiers 667, a location and/or offset in the virtual tape file of data of the record(s) 668, and a size of the record(s) 669. Other entries may have analogous metadata for their corresponding filemarks. In this particular embodiment, each of the entries may have a size that is on the order of 40-bytes, although this is not required. Alternatively, additional information may optionally be stored in the filemark cache if desired, less information than described may optionally be stored if desired, or some of the described information may be omitted and other information may be added.

As mentioned above, each subcache uses some portion of the global resources. The amount of these resources allocated for each subcache may be determined based on various different factors appropriate for the particular implementation. In one embodiment, fixed amounts of the overall resources may be allocated to each of the subcaches. In another embodiment, flexible amounts of the overall resources may be allocated to each of the subcaches (e.g., so that open virtual tape files that desire or need more resources may use them. If and when a subcache consumes too big a percentage of the global resources and/or when the global pool of resources is empty, then filemark cache pruning may be performed as described further below (e.g., to selectively remove entries preferentially from the relatively largest or greediest subcaches). In yet other embodiments, the allocation of resources or the size of the subcaches may be based on other factors (e.g., a size of the open virtual tape file, a number of filemarks in the open virtual tape file, based on projections of likely need, etc.). In still other embodiments no subcaches may be used, but rather a global cache may be shared without such logical apportioning between subcaches.

The number of entries in a subcache may vary widely (e.g., depending upon activity associated with the corresponding virtual tape file). Commonly, there may be on the order of around hundreds to thousands of entries per organization structure, although the scope of the invention is not so limited. In one embodiment, each subcache may potentially store entries for many, a majority, or potentially all of the filemarks for the corresponding open virtual tape file. The physical size of the filemark cache in total memory resources may be allocated in accordance with the size of the storage appliance in terms of number of open virtual tape cartridges permitted at any one time and also in terms of a reasonable number of filemarks stored in each subcache corresponding to these open virtual tape cartridges. In one particular embodiment, the filemark cache may be designed to allow several hundred subcaches (e.g., from around 100-1000 or 300-700) each corresponding to a different open virtual tape file to each have a splay tree having several thousand (e.g., from around 1000-8000 or 2000-6000) entries each corresponding to a different filemark, although the scope of the invention is not so limited.

In one particular example embodiment, the pseudocode listed below may be used to represent a single entry in a filemark cache, although the scope of the invention is not so limited.

```
struct vtc_meta {
    dd_magic_t magic; /* used to validate structure */
    dd_uint32_t version; /* version of structure definition */
    dd_uint32_t logical_object_id; /* the logical object number */
    dd_uint32_t filler; /* Unused */
    off_t offset; /* Where the next record would be */
    /*
     * u.record is used for data records.
     * u.file is used for file mark records
     */
    union {
        struct {
            dd_uint32_t size; /* size of the record */
            dd_uint32_t reserved0;
            dd_uint32_t reserved1;
            dd_uint32_t crc; /* Data CRC */
        } record;
        struct {
            off_t next; /* Filemarks are on a double linked list */
            off_t prev;
        } file;
    } u;
}
typedef struct vtc_meta vtc_meta_t;
```

FIG. 7 is a block flow diagram of an embodiment of a method 770 of using a filemark cache to move between filemarks in a virtual tape cartridge. By way of example, the method may be performed by a storage appliance or other equipment of a remote archive repository and/or implementing a virtual tape library. Operations of the method may be performed by processors, or other circuits or hardware of the equipment.

At block 771, a request to move within or between filemarks on the virtual tape cartridge is received, for example, at a remote archive repository and/or a storage appliance. Representatively, external software (e.g., a backup application) may send a command (e.g., a SCSI command) to the remote archive repository and/or the storage appliance to perform a position operation using filemarks to position a physical tape which is actually emulated by a virtual tape. For example, one such SCSI command is a SPACE command which may have subcommands or specifiers that specify a relative or absolute movement between filemarks (e.g., move three filemarks forward, move to beginning of media, etc.). A command parser (e.g., a SCSI command parser) of the remote archive repository and/or a storage appliance may receive the command or request.

At block 772, the filemark cache is accessed with a current offset into a virtual tape file corresponding to a filemark based on the received request. For example, the received request may be communicated to a virtual tape drive corresponding to a virtual tape cartridge that is used to emulate the physical tape cartridge associated with the received request. In some embodiments, a subcache of the filemark cache corresponding to the virtual tape cartridge and/or a virtual tape file may be accessed. During the first iteration of the method, the current offset may be established in various different ways. Often, the virtual tape is not positioned precisely at a filemark, but rather someplace else (e.g., at a data record between filemarks). In one embodiment, the FM head of the virtual tape file format (e.g., FM head 556 in FIG. 5) may be accessed to determine the offset of the first filemark (e.g., filemark 554-1 in FIG. 5) in the virtual tape file. This offset may be used (e.g., as a bootstrap) as the current offset during the first iteration of the method to access the filemark cache. As another option, in one embodiment, the filemark cache may be seeked for the nearest filemark either before or after the current position in the virtual tape file. This is discussed in greater detail further below toward the end of the discussion of FIG. 7.

At block 773, a determination is made whether the current offset corresponding to the filemark is cached or otherwise stored in the filemark cache. In some embodiments, this may include comparing the current offset to other offsets stored in the filemark cache (e.g., in a subcache of the filemark cache corresponding to the virtual tape cartridge and/or a virtual tape file). In some embodiments, this may include using a splay tree or other organizational structure to make the determination. By way of example, the current offset may be used as the key for entry in the filemark cache for lookup. An offset for the filemark corresponding to each entry of the filemark cache may be stored or at least represented in the filemark cache. In one embodiment, a record identifier in the filemark metadata stored in the filemark cache (e.g., record identifier 667 in FIG. 6 and/or logical_object_id in the pseudocode listed above) may uniquely identify the filemark and may be converted to/from the filemark offset (e.g., through arithmetic calculation).

If the offset is cached or stored in the filemark cache (i.e., "yes" is the determination at block 773), then the method may advance to block 774. At block 774, filemark metadata (e.g., a forward offset and/or a backward offset for linked closest filemark(s) in a double-linked list) may be read from an entry of the filemark cache corresponding to the current offset used to access the filemark cache. If desired, other filemark metadata (e.g., validity data, CRC data, etc.) may optionally be read, although this is not required. Advantageously, each such "hit" in the filemark cache may help to avoid a need to read the filemark metadata from the open virtual tape file (e.g., as will be described further below in conjunction with block 778), which generally represents a small random read and is not as fast or efficient as the hit in the filemark cache. Such a hit in the filemark cache may help to improve the efficiency of servicing the request to move between the filemarks, especially when moving through a large number of filemarks and/or when a large number of concurrently open virtual tape files are concurrently moving through filemarks. The method may then advance from block 774 to block 775.

At block 775, the current offset may be logically set to be either the forward offset or the backward offset read with the filemark metadata at block 774. The forward offset and/or the backward offset for the linked closest filemark(s) in the double-linked list may be followed as a single step of a walk within the filemarks along the double-linked list toward a desired destination associated with the request received at block 771. For example, the current offset may be set to be the forward offset if the walk of the double-linked list is along the forward linked list in the forward direction, or else the current offset may be logically set to be the backward offset if the walk is along the backwards linked list in the backwards direction. The method may then advance from block 775 to block 776.

At block 776, a determination is made whether the current offset satisfies the received request to move between the filemarks (i.e., the request received at block 771). This is effectively a determination whether the walk or movement through the filemarks along the double-linked list has progressed sufficiently to a point that the desired destination filemark associated with the originally received request has been reached. If the current offset does not satisfy the received request (i.e., "no" is the determination at block 776), then the method may return to 772, where the filemark cache may again be accessed, but this time with the updated current offset a single step further along the walk of the double-linked list. Alternatively, if the current offset does satisfy the received request (i.e., "yes" is the determination at block 776), then the method may advance to block 777, where it is deemed that the handling of the received request is done.

Refer again to the determination at block 773. If the offset is not cached or stored in the filemark cache (i.e., "no" is the determination at block 773), then the method may advance to block 778. At block 778, the open virtual tape file may be accessed, and filemark metadata at the current offset in the open virtual tape file may be read. In some embodiments, the current offset may be an absolute offset into the virtual tape file that indicates a particular filemark metadata. For example, the read filemark metadata may include a forward offset and/or a backward offset for double-linked closest filemark(s). This represents a conventional approach of using the double-linked list in the virtual tape file commonly referred to in the arts as going to a filemark list to find the filemark. That is, when the offset is not in the filemark cache, the conventional approach may be reverted to. Often, this involves a random read of a small number of bytes (e.g., on the order of 40-bytes) at the offset from the open virtual tape file. This virtual tape file may be stored in the hard disk drive array or other mass storage actually used to implement the virtual tape library. As discussed above, such an approach may not be as efficient as using the filemark cache, particularly when a large number of such conventional accesses are performed for a large number of open virtual tape files. The method may then advance to block 779 (optionally) or to block 780.

At block 779, an entry may optionally be added to the filemark cache for the current offset which has the read filemark metadata (i.e., read at block 778), such as, for example, the forward offset and the backward offset to the double-linked filemarks. This may help to improve the usefulness of the filemark cache during subsequent filemark move requests. However, this is optional not required. The method may advance from block 779 or block 778 to block 780.

At block 780, the current offset may be logically set to be either the forward offset or the backward offset read with the filemark metadata at block 778. The forward offset and/or the backward offset for the linked closest filemark(s) in the double-linked list may be followed as a single step of a walk within the filemarks along the double-linked list toward a desired destination associated with the request received at block 771. For example, the current offset may be set to be the forward offset if the walk of the double-linked list is along the forward linked list in the forward direction, or else the current offset may be logically set to be the backward offset if the walk is along the backwards linked list in the backwards direction. The method may then advance from block 780 to block 781.

At block 781, a determination is made whether the current offset satisfies the received request to move between the filemarks (i.e., the request received at block 771). This is effectively a determination whether the walk or movement through the filemarks along the double-linked list has progressed sufficiently to reach the desired destination filemark associated with the originally received request of block 771. If the current offset does not satisfy the received request (i.e., "no" is the determination at block 781), then the method may return to block 772, where the filemark cache may again be accessed but this time with the updated current offset a single step further along the walk of the double-linked list as determined at block 778. Alternatively, if the current offset does satisfy the received request (i.e., "yes" is the determination at block 781), then the method may advance to block 782, where it is deemed that the handling of the request is completed or done.

In some embodiments, moving between filemarks may include a first phase of a relatively coarser granularity movement between filemarks (e.g., a jump over filemarks) and a second phase of a relatively finer granularity movement between filemarks (e.g., walking or stepping along a series of linked or adjacent filemarks). The initial coarser granularity movement may move quickly to a good starting position or nearby filemark offset that is reasonably close to a desired destination filemark offset. In some embodiments, the filemark cache may be accessed for the nearest offset after and/or before a given tape position that is stored the filemark cache. For example, the remote archive repository and/or a storage appliance may know or keep track of a current tape position. The filemark cache may be accessed for an offset after and/or before the current tape position or another given tape position. For example, this may represent a query to the filemark cache for some offset after the current tape position (e.g., an offset after current tape position 1,000,000). In response, the filemark cache may provide an offset that is after the current tape position. However, the offset after the current tape position provided from the filemark cache may not correspond to the very next filemark after the current tape position, unless the offset corresponding to the very next filemark after the current tape position were stored in the filemark cache. Rather, one or more intervening offsets corresponding to one or more intervening filemarks may exist (but may not be stored in the filemark cache) between the current tape position and the offset provided from the filemark cache. Then, in the second phase of the relatively finer granularity movement between the filemarks, these intervening offsets or intervening filemarks may be readily walked or stepped through by following linked or adjacent filemarks by an approach similar to that shown in FIG. 7.

The scope of the invention is not limited to operations that may occur after the handling of the request to move between the filemarks on the virtual tape cartridge is done. However, to further illustrate certain concepts, after the virtual tape cartridge has been positioned as requested, data may be written to the virtual tape cartridge, data may be read from the virtual tape cartridge (e.g., after accessing positions of records in the metadata of the virtual tape file), etc.

FIG. 8 is a block flow diagram of a second embodiment of a method 870 of using a filemark cache to move between filemarks in a virtual tape cartridge. By way of example, the method may be performed by a storage appliance or other equipment of a remote archive repository and/or implementing a virtual tape library. Operations of the method may be performed by processors, or other circuits or hardware of the equipment.

At block 871, a request to move within or between filemarks on the virtual tape cartridge is received, for example, at a remote archive repository and/or a storage appliance, over a network interface. That is, the request is transmitted from a source over a network to the network interface. In some embodiments, the request may be a command, such as a SCSI SPACE command, or other command to position a physical tape.

At block 872, a filemark cache is accessed with an offset in a virtual tape file corresponding to a given filemark. In some embodiments, the given filemark is based on the received request to move between filemarks. In some embodiments, a subcache corresponding to a virtual tape file of a virtual tape cartridge used to emulate a physical tape cartridge pertaining to the received request may be accessed.

At block 873, it is determined that the offset is cached, stored, or otherwise present in the filemark cache. In some embodiments, this may include comparing the offset to other offsets stored in the filemark cache (e.g., offsets of a subcache corresponding to an appropriate virtual tape file). In some embodiments, a splay or other binary tree may be used to make the determination.

At block 874, filemark metadata corresponding to the offset is read from the filemark cache. In some embodiments, the filemark metadata may include at least one offset corresponding to a double-linked list. For example, the filemark metadata may include at least one of a forward offset to a closest filemark linked to the given filemark by a forward linked list and/or a backward offset to a closest filemark linked to the given filemark by a backwards linked list. If desired, other filemark metadata (e.g., validity data, CRC data, etc.) may optionally be read, although this is not required.

In other embodiments, other operations may optionally be added to the aforementioned method. For example, an operation may optionally be added to use the offset of the retrieved filemark metadata to walk or move through filemarks. As another example, an operation may optionally be added to use the offset of the retrieved filemark metadata to re-access the filemark cache. As another example, an operation may optionally be added to use the offset of the retrieved filemark metadata as part of a method of reading and/or writing data records in mass storage. As yet another example, an operation may optionally be added to access an offset in an open tape file by performing a small random read.

FIG. 9 is a block flow diagram of a first embodiment of a method 970 of adding an entry to a filemark cache. By way of example, the method may be performed by a storage appliance or other equipment of a remote archive repository and/or implementing a virtual tape library. Operations of the method may be performed by processors, or other circuits or hardware of the equipment.

At block 972, the filemark cache is accessed with an offset into a virtual tape file corresponding to a filemark. In some embodiments, a subcache of the filemark cache corresponding to the virtual tape cartridge and/or a virtual tape file may be accessed. In some embodiments, the access is responsive to receiving a command or request over a network.

At block 973, a determination is made that the offset corresponding to the filemark is not cached or stored in the filemark cache. In some embodiments, this may include comparing the offset to other offsets (e.g., all offsets in a subcache of the filemark cache corresponding to the virtual tape cartridge and/or a virtual tape file) and finding no matches. In some embodiments, a splay tree or other binary tree may be used to make this determination.

At block 978, an open virtual tape file may be accessed, and filemark metadata at the offset in the open virtual tape file may be read. In some embodiments, the offset may be an absolute offset into the virtual tape file that indicates a particular filemark metadata. In some embodiments, the read filemark metadata may include a forward offset and/or a backward offset for double-linked closest filemark(s). This represents a conventional approach of using the double-linked list in the virtual tape file which is often referred to in the arts as going to a filemark list to find the filemark. Often, this involves a random read of a small number of bytes (e.g., on the order of 40-bytes) at the offset from the open virtual tape file. This virtual tape file may be stored in the hard disk drive array or other mass storage actually used to implement the virtual tape library.

At block 979, an entry may be added to the filemark cache for the offset which has at least some, most, or substantially all of the read filemark metadata read at block 978. In some embodiments, the entry may include substantially all of the read filemark metadata read at block 978 so that when the entry is accessed all the information that could have been accessed from the file system will be available but without needing to perform a file system read. In some embodiments, the filemark metadata of the added entry may include a forward offset and/or a backward offset for double-linked closest filemark(s). In some embodiments, any of the metadata previously described in conjunction with FIG. 5 and/or any of the data stored in the filemark cache as previously described in conjunction with FIG. 6 may be included in the added entry. Advantageously, adding the entry to the filemark cache may help to improve the speed or efficiency of servicing subsequent request to move between filemarks that involve the filemark corresponding to the entry.

FIG. 10 is a block flow diagram of a second embodiment of a method 1083 of adding an entry to a filemark cache for a newly written filemark. By way of example, the method may be performed by a storage appliance or other equipment of a remote archive repository and/or implementing a virtual tape library. Operations of the method may be performed by processors, or other circuits or hardware of the equipment.

At block 1084, a request to write a new filemark on a virtual tape cartridge is received, for example at a remote archive repository and/or a storage appliance. A command parser (e.g., a SCSI command parser) of the remote archive repository and/or the storage appliance may receive the command or other request. Representatively, external software (e.g., a backup application) may send a command (e.g., a SCSI command) to a network interface of a remote archive repository and/or the storage appliance to write the new filemark. Without limitation, this may be done when new records and/or new logical files are written, or for other reasons. The request may be to write the new filemark on a physical tape cartridge that is emulated within a virtual tape library on a virtual tape cartridge.

At block 1085, an open virtual tape file (corresponding to the virtual tape cartridge) may be accessed and new filemark metadata may be written at an offset corresponding to the new filemark to be written in accordance with the received request. In some embodiments, the new written filemark metadata may include a forward offset and a backward offset for linked closest filemarks in a double-linked list. If desired, the new written filemark metadata may optionally include other metadata, such as validity data, CRC data, or the like, although this is not required. In some embodiments, any of the metadata previously described in conjunction with FIG. 5 may be written to the virtual tape file.

At block 1086, an entry having filemark metadata may be added to the filemark cache corresponding to the offset of the new filemark written in accordance with the received request. In some embodiments, the filemark metadata of the added entry may include a forward offset and/or a backward offset for linked closest filemarks in a double-linked list as described elsewhere herein. If desired, the filemark metadata of the added entry may optionally include other metadata, such as, for example, validity data, CRC data, or the like, although this is not required. In some embodiments, any of the metadata previously described in conjunction with FIG. 5 and/or any of the data stored in the filemark cache as previously described in conjunction with FIG. 6 may be included in the added entry. Advantageously, adding the entry to the filemark cache may help to improve the speed or efficiency of servicing subsequent request to move between filemarks that involve the filemark corresponding to the entry.

FIGS. 9-10 show two different embodiments of methods of adding entries to a filemark cache. Another embodiment may combine the methods of FIGS. 9-10 so that entries may be added either when the filemark cache is searched for an entry but the entry is not found as well as when new filemarks are written. An analogous method to that shown in FIG. 10 may be used to remove entries from the filemark cache when filemarks are deleted from the virtual tape file (e.g., when a tape is rewound and overwritten thereby invalidating filemarks).

As previously described, the filemark cache may be built up over time during use (e.g., entries may be added to the filemark cache over time as discussed in conjunction with FIGS. 9-10). A fixed amount of resources (e.g., a fixed amount of memory used to implement the filemark cache) may be used to implement the filemark cache. As a result, there is a limit to the number of entries that can be included in the filemark cache at any one time before the fixed amount of resources used to implement the filemark cache (e.g., the fixed amount of memory) is exhausted. If entries are continuously added to the filemark cache over time, then at some point the filemark cache would ultimately become full and/or no more resources may remain to add additional entries unless entries are freed by the embodiments of pruning operations/methods discussed further below.

Additionally, as previously described, the fixed amount of resources of the filemark cache, referred to as the global cache, may be shared by multiple subcaches (e.g., each corresponding to a different virtual tape cartridge or virtual tape file). Each subcache is competing with the other subcaches for the global cache resources. In some embodiments, each subcache (e.g., each virtual tape cartridge and/or virtual tape file), at least to a point, may be allowed to be locally greedy and attempt to consume as much of the global cache as it desires or needs. As a result, since the filemark cache is limited in size, the one or more relatively active, large file sized, or otherwise greedy subcaches may potentially consume a relatively large or disproportionate amount of the global cache, dominate the global cache, or potentially even fill the entire global cache, unless constrained by the embodiments of pruning operations/methods discussed further below.

In some embodiments, in order to manage the resources of the filemark cache and/or how much of the resources may be allocated among the various subcaches, embodiments of pruning operations or methods may be employed. In a broad sense, the pruning operations involve freeing tied-up resources so that they can be used in the future. Commonly, this involves selecting and removing certain existing entries or existing data of the filemark cache so that new entries or new data can be added to the filemark cache in the future. For example, this may include deleting entries (including filemark metadata) in the filemark cache and reclaiming the resources (e.g., memory) that was used for these entries so that it can be allocated in the future to new entries. For example, the reclaimed memory may be put back into the available memory pool from which future entries are allocated among the subcaches. The pruning may be done by logic coupled with the filemark cache. For example, the pruning may be done by the controller for the filemark cache (e.g., controller 329 and/or 429), a control system for a virtual tape library (e.g., control system 330), or by other logic of a virtual tape library.

Figure 11:
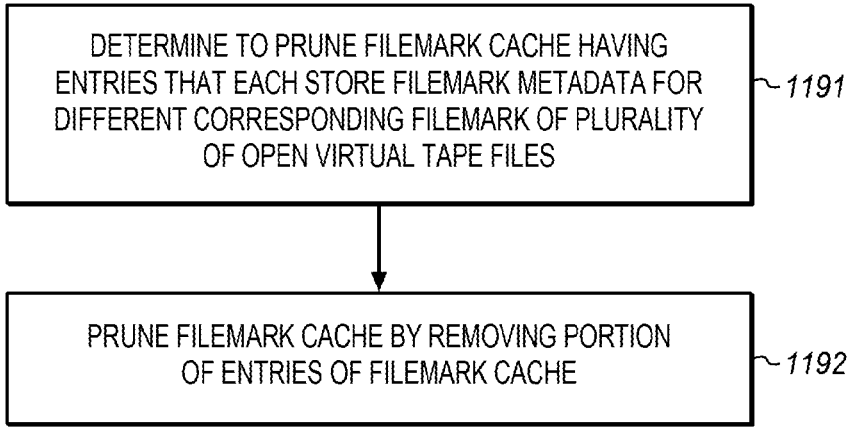
FIG. 11 is a block flow diagram of an embodiment of a method of pruning a filemark cache.

FIG. 11 is a block flow diagram of an embodiment of a method 1190 of pruning a filemark cache. By way of example, the method may be performed by a storage appliance or other equipment of a remote archive repository and/or implementing a virtual tape library. Operations of the method may be performed by processors, or other circuits or hardware of the equipment.

At block 1191, a determination is made to prune a filemark cache having entries that each store filemark metadata for a different corresponding filemark of a plurality of open virtual tape files. In some embodiments, the pruning operations/methods may be performed based on a pruning trigger event that is associated in any of various ways with a level of current resource consumption by the filemark cache. Examples of suitable trigger events include, but are not limited to, the filemark cache being full, the filemark cache being close to full (e.g., within a certain percentage or threshold of being full), the filemark cache having a certain number or threshold of entries, the existence of less than a certain amount or threshold of unallocated resources available to the filemark cache, a given subcache having a given size (e.g., a given number of entries, a percentage of the global cache, a percentage over its preferred size, etc.), or some other such factor or combination of factors. One particular example of a suitable pruning trigger event is a subcache using some overage of its preferred size (e.g., 200% of its design or preferred size). Another particular example of a suitable pruning trigger event is 90%, or some other threshold percentage, of the total resources of the filemark cache being allocated such that they are not available to allocate.

At block 1192, the filemark cache is pruned by removing a portion of the entries of the filemark cache. In various embodiments, various different ways are contemplated for selecting and removing certain existing entries or existing data of the filemark cache. In some embodiments, alternate equally spaced entries may be removed from a subcache of the filemark cache. For example, within a subcache every second, third, fourth, fifth, sixth, seventh, eighth, tenth, twentieth, or other number of entries, may be removed. In one particular example embodiment, every other entry of a subcache (e.g., of the largest or most resource greedy subcache) may be removed in order to reduce the resource consumption of that subcache by approximately half. Pruning every other entry, or at least alternating entries, generally offers an advantage (e.g., when used with a splay tree) that useful filemark metadata is retained in the cache regardless of where the virtual tape cartridges is next seeked to.

In some embodiments, pruning may be applied initially and/or selectively and/or harder to relatively larger subcaches and/or subcaches using relatively more of the overall global cache resources. For example, one or more of the relatively larger subcaches, including generally the largest subcache, may be identified. The largest subcache, and potentially a proportion of the other relatively larger subcaches, may be pruned. In some cases, the largest and/or the proportion of the relatively larger subcaches may be pruned without pruning all of the subcaches and/or without pruning a proportion of the relatively smaller subcaches. For example, in one embodiment, pruning the filemark cache may initially include pruning the largest subcache, then pruning the next largest subcache, then pruning the next largest subcache, and so on, until the filemark cache has been deemed pruned to a desired or appropriate level, and then stopping without pruning the remaining smaller subcaches. In some embodiments, the relatively larger subcaches may be pruned relatively hard (e.g., rather than removing a very small percentage of the entries of these subcaches substantial percentages often ranging from around 25% to 50% of the entries may be removed), although this is not required. For example, in one particular embodiment, about 25%-50% of the entries of the largest subcache may be removed (e.g., every other entry, every third entry, or every fourth entry), then about 25%-50% of the entries of the next largest subcache may be removed (e.g., every other entry, every third entry, or every fourth entry), and so on, until the filemark cache has been deemed pruned to a desired or appropriate level. In one particular embodiment, one or more or all of the subcaches that are over what is considered a fair allocation may be pruned back to the fair allocation. By way of example, the fair allocation may represent a design allocation, an allocation considered appropriate for any one subcache to have taking into consideration the needs of other subcaches to add entries, etc. In some embodiments, pruning may continue until somewhere around 10%-30% of the global resources of the filemark cache have been reclaimed and are available for future allocation, although the scope of the invention is not so limited.

Alternatively, in other embodiments, pruning may be applied substantially uniformly across the set of subcaches irrespective of their relative sizes. For example, a first pruning operation may remove every Nth entry of every subcache, a second pruning operation may again remove every Nth entry of every subcache, and so on, where N may range from around ten to several hundred, until the filemark cache has been pruned to the desired level. In yet another embodiment, such a uniform pruning may be applied to only a proportion (e.g., half) of the relatively largest subcaches and/or to only those subcaches with sizes over a threshold.

To further illustrate certain concepts, consider one detailed example embodiment of a suitable approach to prune a filemark cache, which has subcaches that each correspond to a virtual tape file, with each subcache having a splay tree as an organizational structure, and where each subcache is allowed to be locally greedy but the overall filemark cache is globally limited. Each subcache has a fair number of entries and when the filemark cache becomes close to full then multi-level pruning is applied. Initially, the subcache with the most used cache resources is identified. This subcache is pruned if it has more than twice the fair allocation of cache resources or entries. Up to about half of the entries in this subcache are removed by removing every other entry. This attempts to maintain some information useful regardless of where the tape is next seeked to. With the splay tree and other types of self-organizing search systems, after records are removed, the subcache will be automatically reorganized to adjust for the change. If this releases more than the fair allocation, then no more pruning may be needed. This balances a greedy tape having lots of cached filemark metadata with the need to allow other virtual tape files to cache filemark metadata. Alternatively, if more pruning is deemed needed, the other subcaches may be walked pruning any of these subcaches that have over the fair allocation. When the total pruned/freed resources is around 20% of the global cache, then no more pruning may be needed. This is just one particular illustrative example embodiment of a suitable pruning method. The scope of the invention is not limited to this particular pruning method.

As can be seen, various different embodiments of pruning methods/operations are contemplated. In addition to those mentioned above, other embodiments may randomly select entries to prune. For example, a random or pseudorandom number generator may be included to generate random or pseudorandom numbers to select entries to prune. Still other embodiments may delete a string of adjacent entries in a cache or subcache without skipping over any alternate entries. In still other embodiments, pruning may be based on least recently used entries, various history related estimates of which entries are likely to be used in the future, etc. In still other embodiments, rather than removing entries in batches, entries may be removed "as-needed" during runtime just before corresponding entries are added and may be overwritten by those added entries.

In the description and claims, the terms "coupled" and/or "connected," along with their derivatives, have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

One or more embodiments include an article of manufacture (e.g., a computer program product) that includes a machine-accessible and/or machine-readable medium. The medium may include a mechanism that provides, for example stores or transmits, information in a form that is accessible and/or readable by the machine. The machine-accessible and/or machine-readable medium may provide, or have stored thereon, a sequence of instructions that if executed by a machine cause or result in the machine performing one or more operations, methods, or techniques disclosed herein.

In one embodiment, the machine-readable medium may include a tangible non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or a combinations thereof. The tangible medium may include one or more solid or tangible physical materials, such as, for example, a semiconductor material, a phase change material, a magnetic material, etc.

In another embodiment, the machine-readable media may include a non-tangible transitory machine-readable communication medium. For example, the transitory machine-readable communication medium may include electrical, optical, acoustical or other forms of propagated signals, such as carrier waves, infrared signals, digital signals, etc.)

Examples of suitable machines include, but are not limited to, computer systems, desktops, laptops, network elements, storage appliances, equipment of remote archive repositories, and other electronic devices, equipment, elements, or systems having one or more microprocessors. Such electronic devices typically include one or more processors coupled with one or more other components, such as one or more storage devices (non-transitory machine-readable storage media), user input/output devices (e.g., a keyboard, a touchscreen, and/or a display), and/or network connections. The coupling of the processors and other components is typically through one or more buses/interconnects and bridges (also termed bus controllers). Thus, the storage device of a given electronic device may store code and/or data for execution on the one or more processors of that electronic device.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A computer-implemented method comprising:
   determining to prune a filemark cache, the filemark cache having entries that each store filemark metadata for a different corresponding filemark of a plurality of open virtual tape files; and
   pruning the filemark cache by removing a portion of the entries of the filemark cache, including removing entries from a subcache of a plurality of subcaches of the filemark cache, each of the subcaches corresponding to a different one of the open virtual tape files.

2. The method of claim 1, wherein removing the entries from the subcache comprises removing alternating evenly spaced entries from the subcache.

3. The method of claim 2, wherein removing the alternating evenly spaced entries comprises removing one of every second entry, every third entry, every fourth entry, every fifth entry, every sixth entry, every seventh entry, every eight entry, every ninth entry, and every tenth entry.

4. The method of claim 3, wherein removing the alternating evenly spaced entries comprises removing every second entry.

5. The method of claim 1, wherein pruning comprises removing the portion of the entries from a splay tree.

6. The method of claim 1, wherein pruning comprises removing the portion of the entries that each include a forward offset and a backward offset of a double-linked list of filemark offsets.

7. The method of claim 1, wherein determining comprises determining to prune the filemark cache when a proportion of resources of the filemark cache allocated to the entries meet a threshold.

8. The method of claim 1, wherein pruning comprises:
   selecting a comparatively large subcache of a plurality of subcaches of the filemark cache, each of the subcaches corresponding to a different one of the open virtual tape files, where the comparatively large subcache is larger than at least a majority of the other subcaches; and
   removing entries from the selected large subcache.

9. The method of claim 8, wherein selecting the comparatively large subcache comprises selecting a largest subcache that is larger than any of the other subcaches.

10. The method of claim 9, wherein pruning the filemark cache further comprises:
    selecting a next largest subcache after selecting the largest subcache; and
    removing entries from the next largest subcache.

11. The method of claim 1, wherein removing the portion of the entries comprises removing the portion of the entries from the filemark cache which is implemented at a virtual tape cartridge layer.

12. The method of claim 1, wherein the filemark cache is stored in a memory that is different than a storage in which the open virtual tape files are stored.

13. An apparatus comprising:
    a network interface;
    a memory;

at least one processor;

a filemark cache to have entries that are each to store filemark metadata for a different corresponding filemark of a plurality of open virtual tape files; and a controller coupled with the filemark cache to:
determine to prune the filemark cache; and
prune the filemark cache by removing a portion of the entries of the filemark cache, including removing entries from a subcache of a plurality of subcaches of the filemark cache, each of the subcaches corresponding to a different one of the open virtual tape files.

14. The apparatus of claim 13, wherein the controller is to remove the portion of the entries by removing one of every second entry, every third entry, every fourth entry, every fifth entry, every sixth entry, every seventh entry, every eight entry, every ninth entry, and every tenth entry.

15. The apparatus of claim 13, wherein the controller is to remove the portion of the entries from a splay tree of the filemark cache.

16. The apparatus of claim 13, wherein the controller is to remove the portion of the entries that each include a forward offset and a backward offset of a double-linked list of filemark offsets.

17. The apparatus of claim 13, wherein the controller is to:
select a comparatively large subcache of a plurality of subcaches of the filemark cache, each of the subcaches to correspond to a different one of the open virtual tape files, where the comparatively large subcache is to be larger than at least a majority of the other subcaches; and
remove entries from the selected large subcache.

18. An article of manufacture comprising:
a non-transitory machine-readable medium storing instructions that if executed cause a machine to perform operations including,
determining to prune a filemark cache, the filemark cache having entries that each store filemark metadata for a different corresponding filemark of a plurality of open virtual tape files; and
pruning the filemark cache by removing a portion of the entries of the filemark cache, including removing entries from a subcache of a plurality of subcaches of the filemark cache, each of the subcaches corresponding to a different one of the open virtual tape files.

19. The article of manufacture of claim 18, wherein the machine-readable medium further stores instructions that if executed cause the machine to perform operations including:
pruning the filemark cache by removing one of every second entry, every third entry, every fourth entry, every fifth entry, every sixth entry, every seventh entry, every eight entry, every ninth entry, and every tenth entry.

20. The article of manufacture of claim 18, wherein the machine-readable medium further stores instructions that if executed cause the machine to perform operations including:
pruning the filemark cache by removing entries from a splay tree.

21. The article of manufacture of claim 18, wherein the machine-readable medium further stores instructions that if executed cause the machine to perform operations including:
pruning the filemark cache by removing entries that each include a forward offset and a backward offset of a double-linked list of filemark offsets.

* * * * *